April 20, 1965   M. E. MORCEAU   3,179,286
FOOD CONTAINER
Filed June 6, 1963
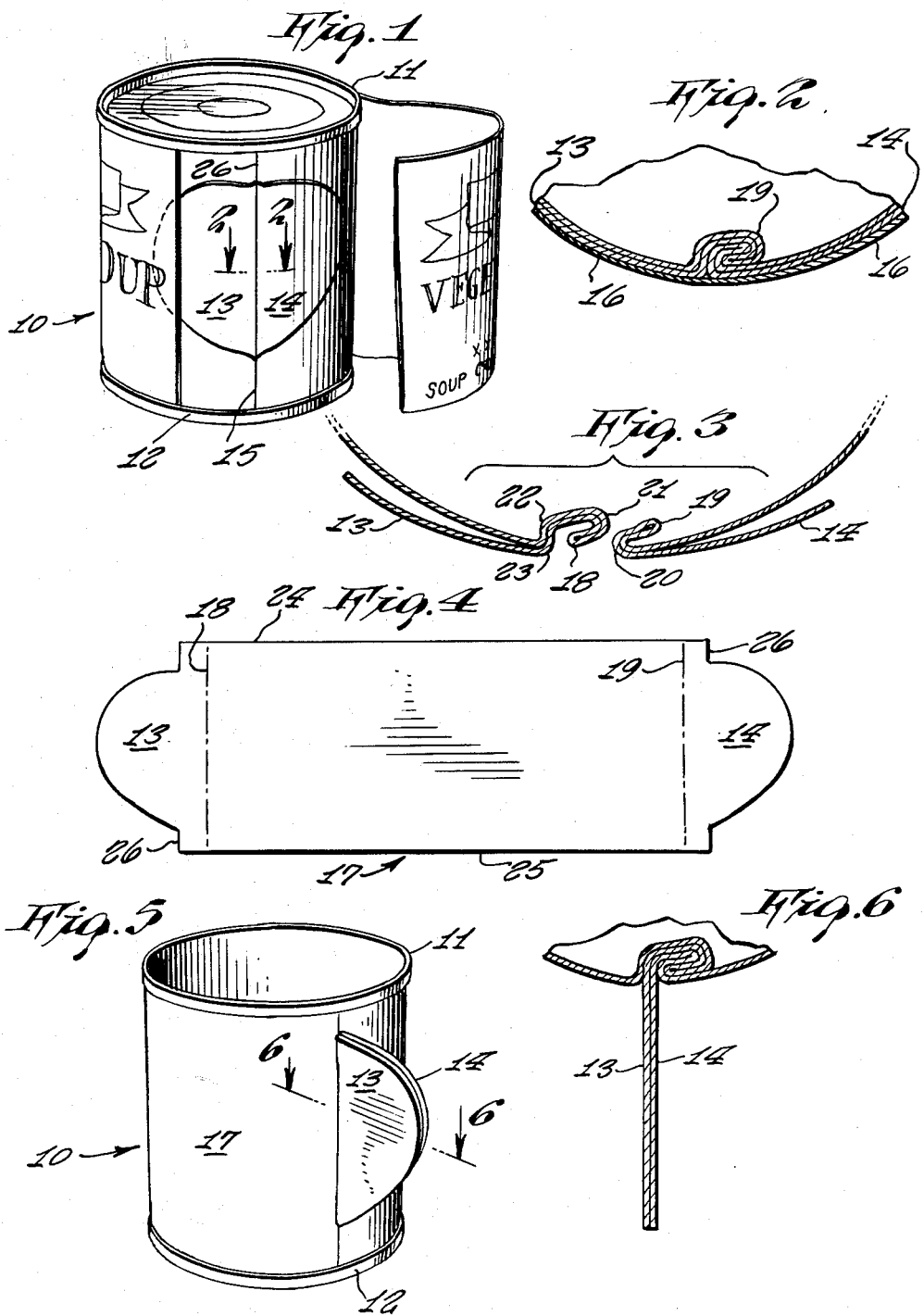

3,179,286
FOOD CONTAINER
Marcel E. Morceau, 111—39 76th Road,
Forest Hills, N.Y.
Filed June 6, 1963, Ser. No. 285,975
1 Claim. (Cl. 220—94)

This invention relates to a cup or cooking utensil made from a food container commonly known as a tin can.

It is an object of this invention to provide a food container which is easily changeable into a cup.

It is another object to provide a food packaging container which has a secondary use as a cup.

It is another object to provide a food container whose integral cylindrical body portion functions as the wall of the cup and also provides handles for a cup.

It is another object to provide a soup can which can be used as a cup for drinking the soup therein.

These and other objects of this invention will become apparent upon reading the following descriptive disclosure thereof taken in conjunction with the accompanying drawing in which;

FIG. 1 is a perspective view of a food container tin can showing the handles embracing the cylindrical surfaces and with overlying label partially removed, FIG. 2 is a view taken on line 2—2 of FIG. 1 showing the manner of crimping the ends of the unique sheet metal blank to form the abutment seam, FIG. 3 is a view of the configurated abutments before being engaged to form the linear seam, FIG. 4 is a planar view of the unique blank of sheet metal showing the handles on each end and showing by means of dotted outline the line of reverse fold at each end of the blank, FIG. 5 is a perspective view of the container in cup form with the label removed and the handles in the contacting and extended position for being engaged by the fingers, and FIG. 6 is a view taken on line 6—6 of FIG. 5.

In the conventional practice of making hot soup from the contents of a conventional cylindrical tin can the can is opened and the contents therein are poured into a saucepan and heated and then poured into a serving plate.

According to this invention the can itself is heated in hot water or otherwise and the can also functions as a serving cup when the contents therein are opened to the atmosphere.

However, this invention is not limited to soup containers, since it is useable for changing any tin can into a corresponding cup.

In undeveloped countries these cups are useable as dinnerware, this is especially so if the tin cans are provided with painted or enameled exteriors with or without advertising indicia thereon.

However, and preferably the tin can is provided with a conventional paper label overlying the cylindrical body portion and its handles embracing the cylindrical surface.

Also the can need not be cylindrical for it may be a square configuration.

The generic concept of this invention is the conversion of a food container into a cup merely by the extending of handles secured to the container and normally embracing or contacting the container wall.

Preferably the handles are integral with the container blank and they may be provided with one or more apertures as air vents for cooling purposes when the containers are used to serve hot food or drink.

Turning to the drawing, a tinned sheet metal container 10 is provided with a conventional top bead 11 and a bottom bead 12.

A pair of integral sheet metal handles 13 and 14 extend from the seam 15 and are pressed to the cylindrical surface of the container body (FIG. 2) and a label 16 is pasted over the handles and the container body portion.

As shown in FIG. 4, the cylindrical body portion of the container and the opposing handles 13 and 14 are made from an integral flexible blank 17 by effecting a reverse fold at a respective fold line 18 and 19.

After the blank is folded on lines 18 and 19 backwardly against the exterior surface of blank 17, the fold 19 is given a hook shape by folding the two plys at fold line 20.

The end having the fold line 18 is given a substantially C-shaped configuration by suitable folding of the two ply material at points 21, 22 and 23 (FIG. 3).

As shown in FIG. 2, the fold line 19 is disposed within the C-shaped configuration of the opposed end of the blank and crimped rigidly therein and sealed therein by means of conventional low melting point solder.

While a sheet metal blank having but a single handle, for example, handle 13 is operable, a dual handle of elements 13 and 14 is preferred.

Moreover, the handles themselves may be variously configurated and each provided with one or more apertures of the same or different outline. Thus the handles 13 and 14 may be provided with finger engaging apertures or they may be corrugated to prevent slipping in the fingers.

The blank 17 is provided with a generally rectangular body portion having opposed integral wing like handle 13 and 14 at the respective ends thereof.

Clearly, the size of the blank may be varied and the shape of the handles may be varied. In all instances the handles 13 and 14 are disposed away from the top linear edge 24 and the bottom linear edge 25 of the blank (FIG. 4) by a suitable linear side edge 26 thereby allowing for the beads 11 and 12.

I claim:

A dual purpose metal food cylindrical container which when opened functions as a cooking utensil comprising a top sheet metal disc, a like bottom sheet metal disc, and a flexible sheet metal cylindrical body made from a single blank and seamed to said top and bottom discs, said body being made from a substantially rectangular sheet having a pair of integral handles disposed at a right angle to each of the longitudinal edges of said blank, said blank being double seamed to effect opposed cylindrical folding of said handles against the container body wall whereby said container functions as a conventional grocery can and when opened it functions as a cooking utensil having a handle.

References Cited by the Examiner
UNITED STATES PATENTS

| Re. 18,711 | 1/33 | Levy | 220—94 |
| 301,977 | 7/84 | French | 220—94 |
| 706,635 | 8/02 | Booth | 40—306 |
| 1,369,470 | 6/18 | Levy | 220—94 |
| 1,384,725 | 7/21 | Levy | 229—52 |
| 1,852,830 | 4/32 | Whitcomb | 229—1.5 |
| 2,287,644 | 6/42 | Schacht | 229—52 |
| 2,719,662 | 10/55 | Minteer et al. | 229—87 |

FOREIGN PATENTS

| 632,927 | 7/36 | Germany. |

THERON E. CONDON, *Primary Examiner.*